United States P
Schilz et al.

3,941,456
Mar. 2, 1976

[54] DEVICE FOR REDUCING THE GRANULATION IN THE TRANSMISSION OF OPTICAL INFORMATION BY MEANS OF A HIGHLY COHERENT BEAM OF RADIATION

[75] Inventors: Wolfram Schilz, Norderstedt; Manfred Rahlff, Hamburg; Uwe Jurgen Schmidt, Pinneberg; Klaus Gottfried Plass, Hamburg; Eckhard Schroder, Henstedt-Ulzburg, all of Germany

[73] Assignee: U.S. Philips Corporation, New York, N.Y.

[22] Filed: Mar. 25, 1974

[21] Appl. No.: 454,308

[30] Foreign Application Priority Data
Mar. 29, 1973 Germany.......................... 2315658

[52] U.S. Cl. .................. 350/161; 350/188; 353/38; 353/69; 353/122

[51] Int. Cl.² ..................... G02F 1/32; G02B 21/14
[58] Field of Search ........ 350/188, 161; 353/38, 69, 353/122

[56] References Cited
UNITED STATES PATENTS
3,650,608 3/1972 Baker..................... 12/64
3,851,961 12/1974 Winzer..................... 353/122

Primary Examiner—Vincent P. McGraw
Attorney, Agent, or Firm—Frank R. Trifari; Simon L. Cohen

[57] ABSTRACT

A device is described for reducing the granulation during the transmission of optical information with a highly coherent radiation beam. The device includes a first objective system, a radiation-diffusing element disposed in the image plane thereof, a second objective system and a radiation refracting element of a medium whose refractive property is variable under the influence of an ultrasonic wave.

10 Claims, 3 Drawing Figures

DEVICE FOR REDUCING THE GRANNULATION IN THE TRANSMISSION OF OPTICAL INFORMATION BY MEANS OF A HIGHLY COHERENT BEAM OF RADIATION

The invention relates to a device for reducing granulation when transmitting optical information by means of a highly coherent beam of radiation.

A known effect associated with imaging by means of a highly coherent beam of radiation is the occurrence of granulation. Said granulation always occurs when the radiation path includes media which scatter the radiation statistically. Such media may for example be constituted by the objects to be imaged themselves, or by holographic storage media, such as photo-emulsions, or by projection walls on which information is imaged with the aid of laser light. The images, line drawings etc. thus formed exhibit a statistical distribution of intensity maxima and minima. Theoretical studies have revealed that the size of individual maxima or minima which are imaged onto the retina of the observer only depends on the pupil diameter and on the wavelength of the radiation used. When a text is projected onto a screen with the aid of a laser beam, the maxima and minima will have an increasing diameter at an increasing observation distance. When said diameter is of the order of magnitude of the image elements, the effective resolution decreases, so that finally the text is no longer readable. Moreover, even for a size of the maxima and minima which is substantially below the size of the picture elements, the granulation effect is very fatiguing for the observer.

Various methods have been proposed for reducing the said negative effects of granulation. All known methods are based on the idea that granulation can be reduced by superposition of several images of the same information content but with a statistically independent granulation distribution. The constituent images then should not interfere with each other, which means that the individual images must be superposed incoherently. This may be achieved by the simultaneous superposition of images produced by means of mutually incoherent beams. It is alternatively possible to project the individual images in rapid succession. Theoretical and experimental research has revealed that a satisfactory averaging of the granulation is not achieved until 50 to 100 granulation images are superposed.

The methods of eliminating granulation known to date are effective and in part comparatively simple in all cases in which the information content is reproduced statically, as for example with the aid of a slide projector or a stationary hologram. In such cases it suffices to produce approx. 50 images in 1/25 second to cause the granulation to disappear for an observer. The images may be readily produced for example by disposing a radiation-diffusing disk which rotates with relatively low speed at a suitable location in the radiation path.

However, far more difficult is the situation in which information is transmitted through the point-by-point scanning of an image with the laser beam. In this case the granulation can be eliminated only when during the dwell time of the laser beam in an image point the previously stated 50 independent patterns of granulation are produced consecutively. As the dwell time in many applications (e.g. television pictures) is of the order of one microsecond or even less, this requirement implies that the granulation patterns must change at a rate of approx. 10 to 100 MHz. In German Patent Application 21 50 495 a method is described which in principle enables a change of granulation patterns at such a frequency. According to said method the projected image is first imaged at microscopic size on a ground-glass screen with a very fine-grained structure. At a very small distance (of the order of magnitude of approximately 1 $\mu$m) a second similar ground-glass screen revolves, so that after a slight rotation of approx. 0.02 $\mu$m a new granulation pattern is obtained.

For dwell times of the laser beam of e.g. 2$\mu$secs., which correspond to deflection frequencies of 500 kHz now attainable with digital light deflection, this results in a speed of rotation of the ground-glass screen 1 m/sec. Said speed combined with the required high precision of the movement imposes extremely stringent requirements on the mechanical means of such a device.

It is an object of the present invention to provide a device in which the granulation is reduced without intricate mechanical means and without macroscopically moved means.

The device according to the invention is characterized in that it comprises a radiation-diffusing element disposed in the image plane of a first objective system, a second objective system behind the radiation-diffusing element, and at least one radiation refracting element of a medium whose radiation-refracting property is variable under the influence of an ultrasonic wave, whose wavelength is at least of the order of magnitude of the size of a granulation element of the beam of radiation at the location of the radiation-refracting element.

The information to be reproduced is first imaged onto a stationary ground-glass screen with a fine-grained structure, the image produced on said plate being imaged onto the actual display screen by a second objective while behind or in front of the second objective a liquid or solid medium is disposed which is excited by ultrasonic waves.

The invention will now be described with reference to the drawing, in which.

Figure 1:
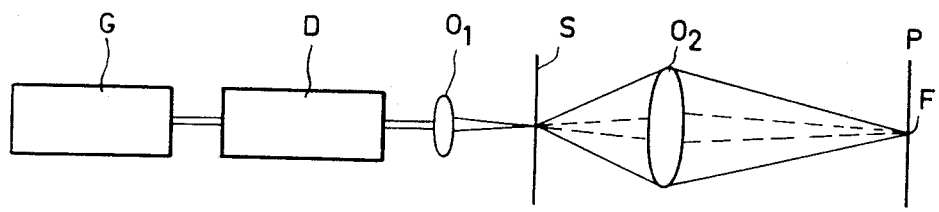
FIG. 1 shows a diagram of a laser reproduction system.

FIG. 1 schematically shows the basic arrangement of a laser reproduction system, which operates with a digital laser beam deflector. The laser beam produced by a laser source G first traverses the digital light deflector D and is subsequently focussed by a first objective O onto a radiation-diffusing disk S which is disposed in the focal plane of said objective. By the operation of the light deflector a primary image of the information to be reproduced is obtained in said focal plane. Without the radiation-diffusing disk S the laser beam, which is generally of the fundamental-mode type, would be focussed onto the screen P by the second objective $O_2$ in accordance with the dashed lines representing the beam limitation. The radiation-diffusing disk S widens the laser beam in such a way that the scatter cone fills the aperture of the objective $O_2$. A screen disposed in the plane of the aperture, which also constitutes the exit pupil of the projection system, exhibits the granulation pattern which is characteristic of laser light for any position at which the laser beam hits the radiation-diffusing disk. This granulation pattern shows that the waveform of the radiation emerging from the radiation-diffusing disk is only approximately spherical. The wave fronts exhibit substantial, fine-structured phase fluctuations. As a result, the intensity distribution within the focal spot F on the screen P is also subject to substantial fluctuations and exhibits a granular structure. Said structure is finer according as the aperture of the objective $O_2$ is larger. Any change of the phase fluctuations of the wave which traverses the objective $O_2$ will result in a change of the granulation in the focus.

Figure 2:
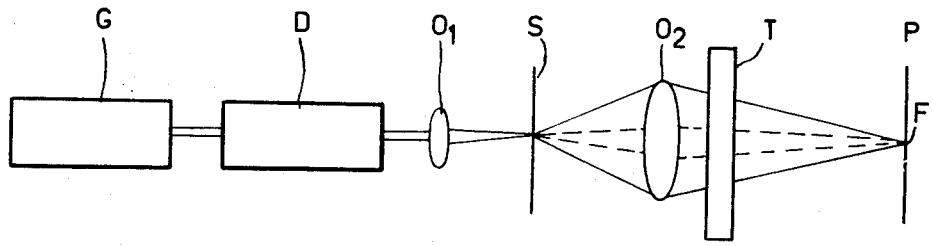
FIGS. 2 and 3 show schematic embodiments of devices according to the invention.

According to the invention, as is shown in FIG. 2, an element T of a liquid or solid medium is disposed in the radiation path before or behind the objective $O_2$. One or more ultrasonic waves propagate through said medium. As is known, ultrasonic waves cause periodic dilutions or densifications of the substance in the transmission medium. Optically this results in a corresponding variation of the refractive index. When the wavelength of the ultrasonic wave is sufficiently short, the periodic variation of the refractive index acts as an optical diffraction grating: a light beam which traverses the medium normal to the direction of propagation of the ultrasonic wave is subjected to zero-order, first-order, second-order etc. diffraction at diffraction angles, as known from the conventional grating theory. Said effect, which has been called after Debye and Sears, is employed in numerous methods of spatial and temporal light modulation. When the wavelength of the ultrasonic wave is substantially greater than that of the light, the periodic variation of the refractive index no longer acts as a diffraction grating, but a periodic "Schlieren" effect is obtained; which means that the effect of the "disturbance" on the propagation of the light may be determined substantially in accordance with the laws of geometrical optics. If the wavelength of the ultrasonic wave is of approximately the same order of magnitude as the diameter of the granulation "grains" of the light wave, said "Schlieren" effect of the ultrasonic wave may be used to advantage. The refractive index gradients caused by the ultrasonic wave result in a deviation of the corresponding individual components of the wave from the original direction of propagation and thus in an amplitude and phase "re-distribution" within the focal spot; which means that the granulation pattern changes. The change is continuously dependent on the continuous variation of the refractive index gradient caused by the ultrasonic wave. Obviously, the directional modulation of the individual components of the light wave is accompanied by a certain widening of the focal spot. The smaller the diameter of the granulation grains in the focal spot, the smaller are the refractive index gradients caused by the ultrasonic wave which are necessary for a change of the granulation structure and the smaller becomes the widening of the focal spot for a desired degree of elimination of the granulation. The degree of elimination of the granulation and the diameter of the focal spot are consequently interrelated. Moreover, for the same parameters, the elimination of the granulation is better as the aperture of the objective $O_2$ is larger at a corresponding widening of the scatter cone. Tests have revealed that under practical conditions of large-screen projection with laser radiation, granulation can be eliminated to a satisfactory degree at a slight enlargement of the focal spot, - approx. 25 to 50%.

Even more favorable results than with the abovedescribed device can be obtained when instead of the periodic ultrasonic wave an aperiodic ultrasonic wave is employed, the correlation length of said wave corresponding to that of the optical wave. The aperiodic ultrasonic-wave can be obtained by approximation by exciting further ultrasonic frequencies in the same cell or in a second cell disposed behind it. Excitation may take place in one or more media. The device according to the invention may be improved still further by generating a second ultrasonic field in a direction normal to the direction of propagation of the light and normal to the direction of the first ultrasonic field. Thus, a higher degree of elimination of granulation can be attained at the same defocussing.

The medium in which the ultrasonic waves are generated need not be disposed near the exit aperture of the imaging system. The medium may also be disposed near the primary image or near the projection screen P. According to the above instructions the wavelength of the ultrasonic wave will have to be smaller in those cases.

The fact that the invention has been explained by describing its use in a reproduction device in which the image is obtained by scanning by a laser beam, does not imply that the scope of the invention is limited to said application. The invention may also be used in reproduction devices in which spatial laser beam modulation is obtained in a stationary manner, for example with the aid of a hologram on a photographic plate. The ultrasonic cell may then be disposed in the exit pupil of the system.

Instead of with the "Schlieren" method, the image on the display screen may also be moved over a path which is small relative to the smallest perceptible picture detail by means of a body disposed in the radiation path near the objective, for example of a prismatic body, whose position or contour can be changed by means of ultrasonic waves.

Figure 3:
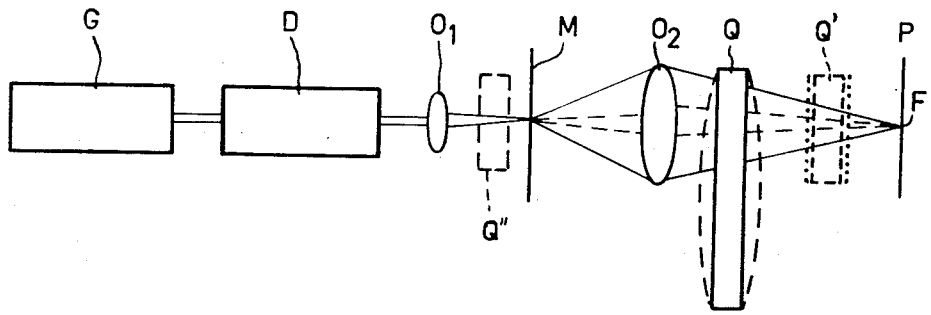

In the device of FIG. 3 a laser beam generated by a laser generator G is deflected so by the beam deflector D that the beam produces an image of the information to be displayed in the focal plane of an objective $O_1$ disposed behind the deflector. A ground-glass plate M disposed in the focal plane widens the laser beam, which is generally in the fundamental mode, to a scatter cone. The diffused radiation is intercepted by a second objective $O_2$. Said objective images the primary image onto the actual projection screen P, on which the information is to be observed subjectively or objectively. The scatter cone which emerges from each point of the primary image is approximately a spherical wave, whose phase front is subject to certain fluctuations. In the absence of the ground-glass plate M the fundamental-mode laser beam will propagate as indicated by the dashed bounding lines behind the focal plane of the first objective $O_1$. At the location of the focus F on the projection screen P the wave front is then plane and the intensity distribution is homogeneous. Owing to the roughness of the screen P the beam is scattered back as a broad spatial cone. Since all elementary waves of the scattered back wave have statistically different phases, but in general exhibit a mutual degree of coherence of approx. 1 the granulation to be observed objectively and subjectively occurs.

The conversion of the fundamental-mode laser beam into a widened diffused beam has no direct effect on the granulation effect, but it ensures that the intensity distribution in the focal spot on the screen P is no longer homogeneous, but exhibits the variations characteristic of granulation. Moreover, the wave front is no longer plane, but has an irregular structure.

Because of the described structure of the wave front in the focal spot any movement of said spot over the screen over a distance greater than the dimension of a granulation point leads to a variation of the granulation structure in the far field of the light which is scattered back by the screen P. For example, if somebody observes the image produced by the laser at such a distance that the granulation elements in the picture element are no longer observed separately, the observer receives the impression of a continually changing pattern of granulation on his retira during the said movements.

If the image projected onto the screen P through the ground-glass plate M is moved at high frequency over a distance which is a fraction of the size of a picture element and greater than the diameter of the granulation element, i.e. that the amplitude of an ultrasonically-controlled medium is employed, this also allows a substantial reduction of the granulation to be obtained.

Behind the objective $O_2$ a medium is located of a material that can be excited by ultrasonic waves of a wavelength of the order of magnitude of the objective aperture. A preferred embodiment consists of an oblong quartz plate Q, which is excited to acoustic resonance. In this case the thickness of the plate in the center varies with maximum amplitude, while the amplitude of the thickness variation decreases towards the outside. Accordingly, the quartz plate functions as a double prism with variable refraction. When the plate is disposed in front of the objective $O_2$ with one of the two halves and the thickness is varied periodically, the light beam emerging from the objective will be periodically deflected through a generally small angle. The focal spot of the laser beam on the projection wall P is then moved accordingly. When the amplitude of said periodic movement is greater than the average size of the granulation elements, an observer at a distance from which the individual intensity fluctuations in the focal spot can no longer be perceived, will observe a granulation structure which is independent of said movement.

At a sufficiently high amplitude of the periodic thickness variations and a sufficiently small granulation structure in the focal spot the number of independent granulation structures observed by the observer becomes so high that the observed granulation is averaged at the expense of only a slight loss of picture definition.

The number of independent granulation structures viewed by the observer may be increased substantially when the movement of the focal spot occurs in two directions. Therefore, elaborating the concept underlying the invention, two vibration plates are disposed in the radiation path, one plate Q being turned through 90° about the axis of the system relative to the other plate Q'.

According to a further modification a further vibration plate Q'' may be disposed near the objective $O_1$, with the aid of which the focus of the laser beam can be moved over the ground-glass plate M. The two plates Q and Q'' are caused to vibrate synchronously with such an amplitude and in such a direction that the focus F on the projection screen P is stationary. Owing to the co-operation of the two vibrations the granulation in the focal spot in the projection screen changes with time, without a loss of picture definition.

The device may also be employed in imaging systems with stationary spatial laser beam modulation, utilizing for example holograms.

What is claimed is:

1. A device for reducing the granulation when transmitting optical information with the aid of a highly coherent beam of radiation, wherein it comprises a radiation diffusing element disposed in the image plane of a first objective system, a second objective system behind the radiation diffusing element, and at least one radiation refracting element of a medium whose radiation refracting property is variable under the influence of an ultrasonic wave whose wavelength is at least of the order of magnitude of the size of a granulation element of the radiation beam at the location of the radiation refracting element.

2. A device as claimed in claim 1, wherein the radiation-refracting element is constituted by a cell with a liquid medium, in which an ultrasonic wave propagates in a direction transverse to the direction of propagation of the radiation beam.

3. A device as claimed in claim 2, wherein the ultrasonic wave is composed of several waves of different ultrasonic frequencies.

4. A device as claimed in claim 2, wherein a second ultrasonic wave propagates through the medium, whose direction of propagation is transverse to that of the radiation beam and transverse to that of the first wave.

5. A device as claimed in claim 2, wherein a second cell with a liquid medium is disposed in the radiation path, in which cell an ultrasonic wave propagates in a direction transverse to the direction of propagation of the radiation beam and transverse to the direction of propagation of the ultrasonic wave in the first cell.

6. A device as claimed in claim 1, wherein a beam-refracting element is constituted by a prismatic body of a solid material, whose beam-refracting property is variable under the influence of an ultrasonic wave.

7. A device as claimed in claim 6, wherein a second prismatic body is provided having the same property as the first prismatic body, and in that second body is disposed at 90° relative to the first body.

8. A device as claimed in claim 6, wherein a first prismatic body is disposed behind the first objective system and before the radiation diffusing element, and a second prismatic body is disposed behind the second objective system.

9. A device as claimed in claim 6, wherein a prismatic body is constituted by a stationary plate of an optically refracting material, whose thickness is variable in the direction of propagation of the radiation beam.

10. A device as claimed in claim 6, wherein a prismatic body is constituted by a prism of an optical refractive material of fixed dimensions, whose orientation is variable.

* * * * *

UNITED STATES PATENT AND TRADEMARK OFFICE
CERTIFICATE OF CORRECTION

PATENT NO. : 3,941,456
DATED : March 2, 1976
INVENTOR(S) : WOLFRAM SCHILZ ET AL

It is certified that error appears in the above-identified patent and that said Letters Patent are hereby corrected as shown below:

Col. 2, line 38, after "objective" should be -- , --;

Claim 7, line 3, after "that" should be --the--;

Signed and Sealed this

Sixth Day of July 1976

[SEAL]

Attest:

RUTH C. MASON
*Attesting Officer*

C. MARSHALL DANN
*Commissioner of Patents and Trademarks*